US010299091B2

(12) United States Patent
Schoppmeier

(10) Patent No.: US 10,299,091 B2
(45) Date of Patent: May 21, 2019

(54) INTERNET OF THINGS PROTOCOL HANDLER

(71) Applicant: INTEL CORPORATION, Santa Clara, CA (US)

(72) Inventor: Dietmar Schoppmeier, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 15/189,514

(22) Filed: Jun. 22, 2016

(65) Prior Publication Data

US 2017/0374490 A1    Dec. 28, 2017

(51) Int. Cl.
*H04W 4/70* (2018.01)
*H04L 29/08* (2006.01)

(52) U.S. Cl.
CPC ............... *H04W 4/70* (2018.02); *H04L 67/12* (2013.01)

(58) Field of Classification Search
None
See application file for complete search history.

(56) References Cited

U.S. PATENT DOCUMENTS

| 9,606,817 | B1* | 3/2017 | Efstathopoulos | ....... G06F 9/455 |
| 2015/0229613 | A1* | 8/2015 | Baum | .................. H04L 63/061 |
| | | | | 713/171 |
| 2015/0295763 | A1* | 10/2015 | Yu | ......................... H04L 41/08 |
| | | | | 726/4 |
| 2016/0328719 | A1* | 11/2016 | Ananchaperumal | ........................ |
| | | | | G06Q 30/0201 |
| 2016/0371074 | A1* | 12/2016 | Vyas | ..................... H04W 4/005 |
| 2017/0099353 | A1* | 4/2017 | Arora | ..................... H04L 67/12 |
| 2017/0187807 | A1* | 6/2017 | Clernon | ................. H04W 4/70 |
| 2017/0195267 | A1* | 7/2017 | Ghafourifar | ......... H04L 51/066 |
| 2017/0279894 | A1* | 9/2017 | Chen | .................... H04L 67/125 |

* cited by examiner

*Primary Examiner* — Kodzovi Acolatse
(74) *Attorney, Agent, or Firm* — Eschweiler & Potashnik, LLC

(57) ABSTRACT

A protocol handler communicatively coupled to client devices in an internet of things (IoT) network can operate to update manufacturer specific parameters for corresponding different protocols. A protocol component of the protocol handler can map updates from different manufacturers or different manufacturer servers to a translator dataset of a look-up table. The updates can be mapped to an IoT protocol as IoT parameters based on the associations of the look-up table between the different protocols. An IoT translator component can translate communications back and forth from manufacturers or their servers of different communications protocols to one or more of the client devices and vice versa, in which the client devices are associated with different protocols, and can also communicate to one another via the IoT translator in the IoT protocol.

17 Claims, 6 Drawing Sheets

INTERNET OF THINGS PROTOCOL HANDLER

FIELD

The present disclosure is in the field of wireless communications, and more specifically, pertains to a protocol handler communicatively coupled within an internet of things (IoT) network for wireless communications.

BACKGROUND

The internet of things (IoT) includes a system of interrelated computing devices, mechanical and digital machines, objects, animals, or people that are provided with unique identifiers and the ability to transfer a network without requiring human-to-human or human-to-computer interaction. The IoT and related devices therein can find itself within a business, home, or other private confine, or public geographic area in order to enable communications between devices within corresponding boundaries. The client devices can be connected via the IoT in order to communicate sensory status information or data to server and control of the client devices. However, various different technologies/protocols and associated standards pose a difficulty to the hardware as more standards for the technologies/protocols become added, are changed, or updated.

DETAILED DESCRIPTION

Figure 1:
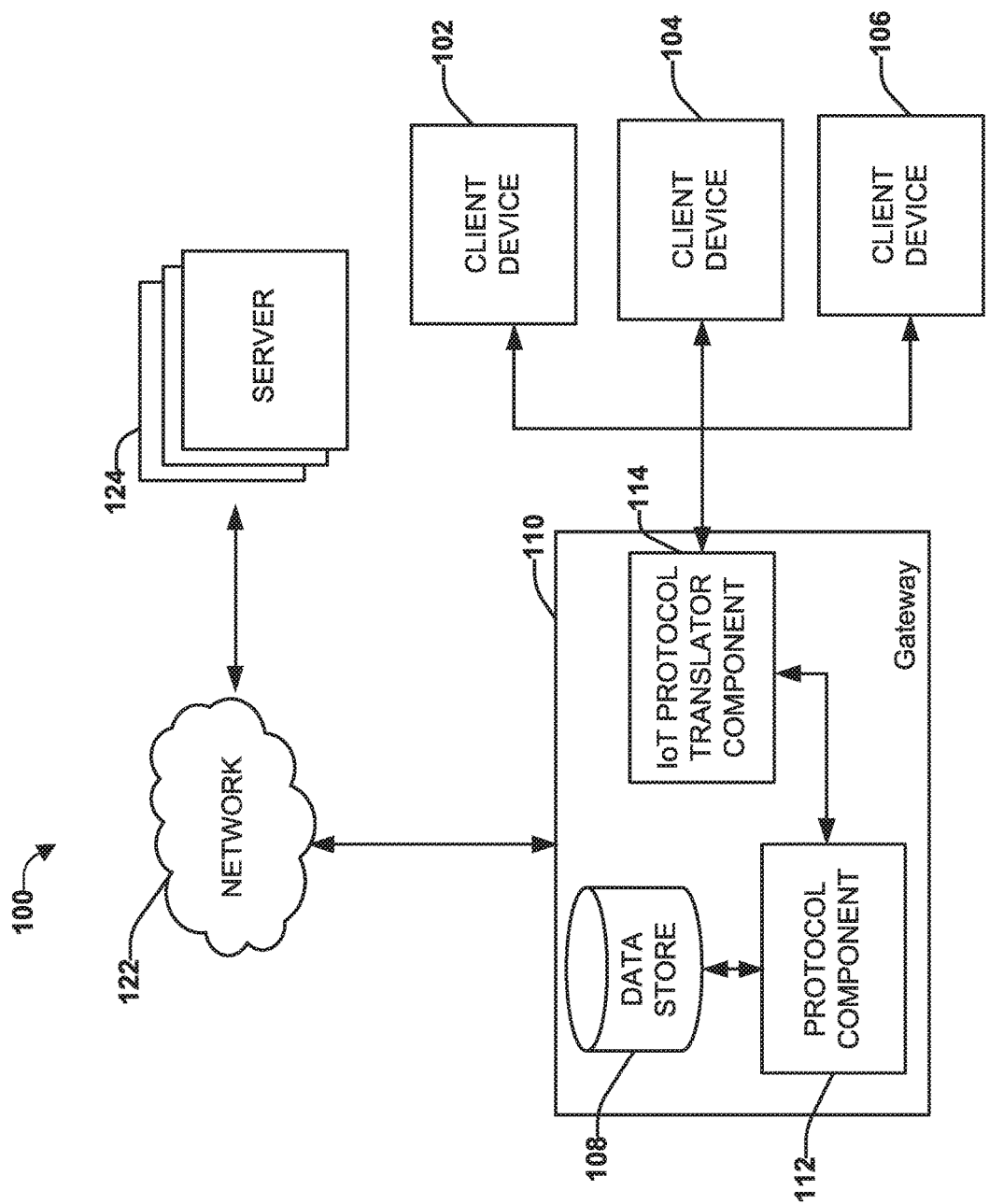
FIG. 1 is a block diagram illustrating a wireless network with IoT protocol translation components according to various aspects.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

Introduction

In consideration of the above described deficiencies of radio frequency communications, various aspects for a protocol handler communicatively coupled within a wireless internet of things (IoT) network are disclosed for enabling protocol translations of communications on an ongoing basis so that updates to various standards and proprietary protocols can be translated and processed. For example, an entity or component of a protocol translator system can operate at a central location to enable different kinds of communication protocol data to come together in a data store/databased for mapping their relationships and facilitating translation, such as among various protocol communication standards being published and agreed upon from one or more different standard organizations, as well as proprietary data at the manufacturer's will and demand of the user.

The protocol data being aggregated or stored can be controlled by a protocol component, and include the updates to current standards or additional standard protocols along with the parameters, rules, formatting, semantics, definitions, or processes related to device communication. Further, the protocol data can include various manufacturer protocol data that can be proprietary or non-proprietary updates related to particular manufacturer protocol parameters or standard implementation updates. The protocol data can thus be controlled, updated, and mapped for translating various communications back and forth between servers and client devices, other network devices and the client devices, and among these client devices, which can be in the home/entity.

As such, client devices such as various home devices, with one or more sensors at their control, can communicate with each of the manufacturers (e.g., manufacturer servers) and among the client devices despite the client devices corresponding to different IoT protocols, or different manufacturer protocols, which could otherwise make them incompatible for communication among them. A client device as used herein can include any device with a processor communicatively coupled to the protocol translator or IoT protocol translator components for protocol translations. These client devices can be home devices such as appliances (e.g., refrigerator, thermostat, microwave, pump, boiler, oven, heating ventilation and air conditioning unit (HVAC), etc.) or any other client device/energy consuming device of a home controlling one or more sensors that operate to measure or detect changes in a physical property or parameter of their environment (e.g., temperature, pressure, flow, or the other properties).

As referred to herein, a client device can also be considered to include a server device with respect to IoT networks, in which these client devices also include sensors that obtain sensor data and serve the sensor data as servers to the network and network devices of the network. As such, the term client device can also be considered a server device with respect to IoT standards, protocols, formats, etc., can be located in an structure/geography/building (e.g., a home or home network geographic area), and can be coupled to protocol translator or IoT protocol translator components, which can reside in a gateway device or an IoT gateway, for example. As such, a client device can be interchangeable with the terminology of a server device when viewed from a perspective of sensor data or sensor status data from these devices. Additional aspects, embodiments or details of the disclosure are further described below with reference to figures.

FIG. 1 schematically illustrates an exemplary protocol handler system 100 that enables protocol translations of communications with client devices in an IoT network area. The system 100 enables communications with a plurality of client devices 102-106 that are communicatively coupled in an IoT network of a home, a building, a specified location, geographic area or other similar network structure/set of boundaries, for example.

Figure 2:
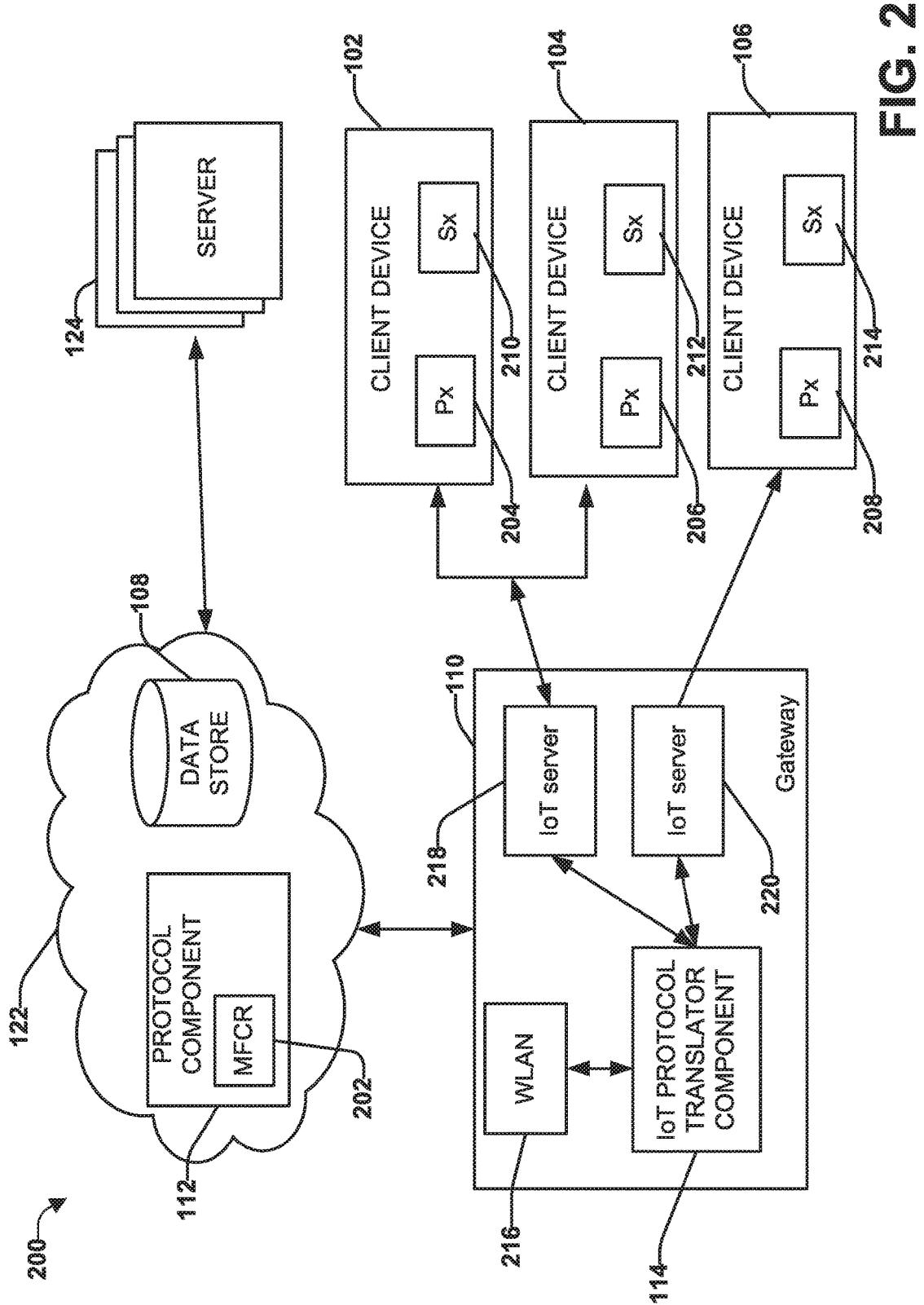
FIG. 2 is another block diagram illustrating a wireless network with IoT protocol translation components according to various aspects.

The client devices 102-104 can comprise different kinds of devices, such as an energy consuming devices with one or more power consuming features/functions. The client devices 102-106 can include other components (as shown in FIG. 2) such as processors, memory, or sensors for detection of sensor data or status data related to the environment or a physical property (e.g., sensors 210-212, processor 204-208, as illustrated in FIG. 2, or the other device components). The client devices 102-106 can also operate as server devices to provide sensor or status data to the IoT network, as well as client devices that receive control data for one or more setting or other data for operation from a gateway 110, wireless network 122 or other network devices such as one or more manufacturer servers 124.

In one example, client device 104 can be a refrigerator, an HVAC system, a microwave, toaster, or any energy consuming device capable of having power consumption measured thereat or operating other sensors within an IoT home network, for example. The client devices 102-106 can also be controllers, or other energy consuming devices, including one or more appliances or in some cases on site electric generation (e.g., solar panel devices, geothermal devices, and the like) and/or energy storage devices (e.g., battery, capacitor, etc.) that are communicatively connected in an IoT network via a controller 110 that can be gateway device, IoT specific gateway, a multi-protocol repeater, a data computing cloud server, a processor, or other component for translating protocols in an IoT protocol for the client devices 102-106.

The system 100 comprises the gateway component 110 having a data store 108, a protocol component 112, and an IoT protocol translator component 114. The protocol component can operate to control the data store or data set 108 and communicate with the IoT protocol translator component 114. Although the protocol component 112 is located at the gateway 110 (e.g., a home gateway device), it could also be located within the network or data/computing cloud 122 as well, along with other networked devices or components such as an IoT-specific gateway, a multi-protocol repeater, or elsewhere, for example.

In one embodiment, the protocol component 112 can operate to control the data store 108, which can include a look-up table comprising one or more translator datasets for receiving updated protocol parameters and related data. These parameters can include standardized definitions, semantics, formats, rules (e.g., server encryption/encapsulation rules, or client encryption/encapsulation rules), or other related standardized protocol data that correspond to one or more different communication protocols, formats, parameters, or dictionary/library of mathematical or semantic data. These different communication protocols can include, for example, digital enhanced cordless telecommunication—ultra low energy (DECT-ULE) protocols/standards as standardized by the European Telecommunications Standards Institute (ETSI), bluetooth 4.2 for low energy mode (IEEE 802.15.1), Z-Wave (by ITU G.9959), ZigBee (by IEEE 802.15.4), Enocean (by ISO/IEC 14543-3-10), 802.11ah, also called Wi-Fi HaLow, LoRa as defined by lora-alliance, as well as ongoing protocols or future protocols, which may be in conjunction with 5G mobile networks or other wireless technologies (e.g. light communication or wireline technologies derived by G3-PLC), for example.

The protocol component 112 can further communicate with one or more severs 124, which can include manufacturer servers or manufacturing databases corresponding to different manufacturers or manufacturing protocols. For example, the protocol component 112 can receive or make request for updates to semantics, rules, definitions or the like related to a particular protocol or device so that the server 124 is able to add to or re-define their protocol semantics within the network 122 or the data store 108 via the protocol component 112.

The protocol component 112 can be further communicatively coupled to the IoT protocol translator component 114. The IoT protocol translator component 114 discussed herein can be included with a physical communication layer (PHY) that can communicate to upper layers in an open system interconnection (OSI) model for further communication to network servers, routers or cloud based applications outside of the home network. The physical (PHY) layer, the media access control (MAC) layer, and the logical link control (LLC) can reside or be integrated within the IoT protocol translator 114 and the protocol component 112. The PHY layer, MAC layer, LLC layer can be IoT protocol-specific and controlled or integrated with the IoT protocol translator component 114, which is different from being manufacturer-specific, and where only layers above LLC could be manufacturer-specific or manufacturer server 124 controlled or comprised. Both the IoT protocol translator component 114 and the protocol component 112 can comprise PHY, MAC and LLC and reside within the gateway (home gateway) device 110 at the home, as illustrated.

Figure 3:
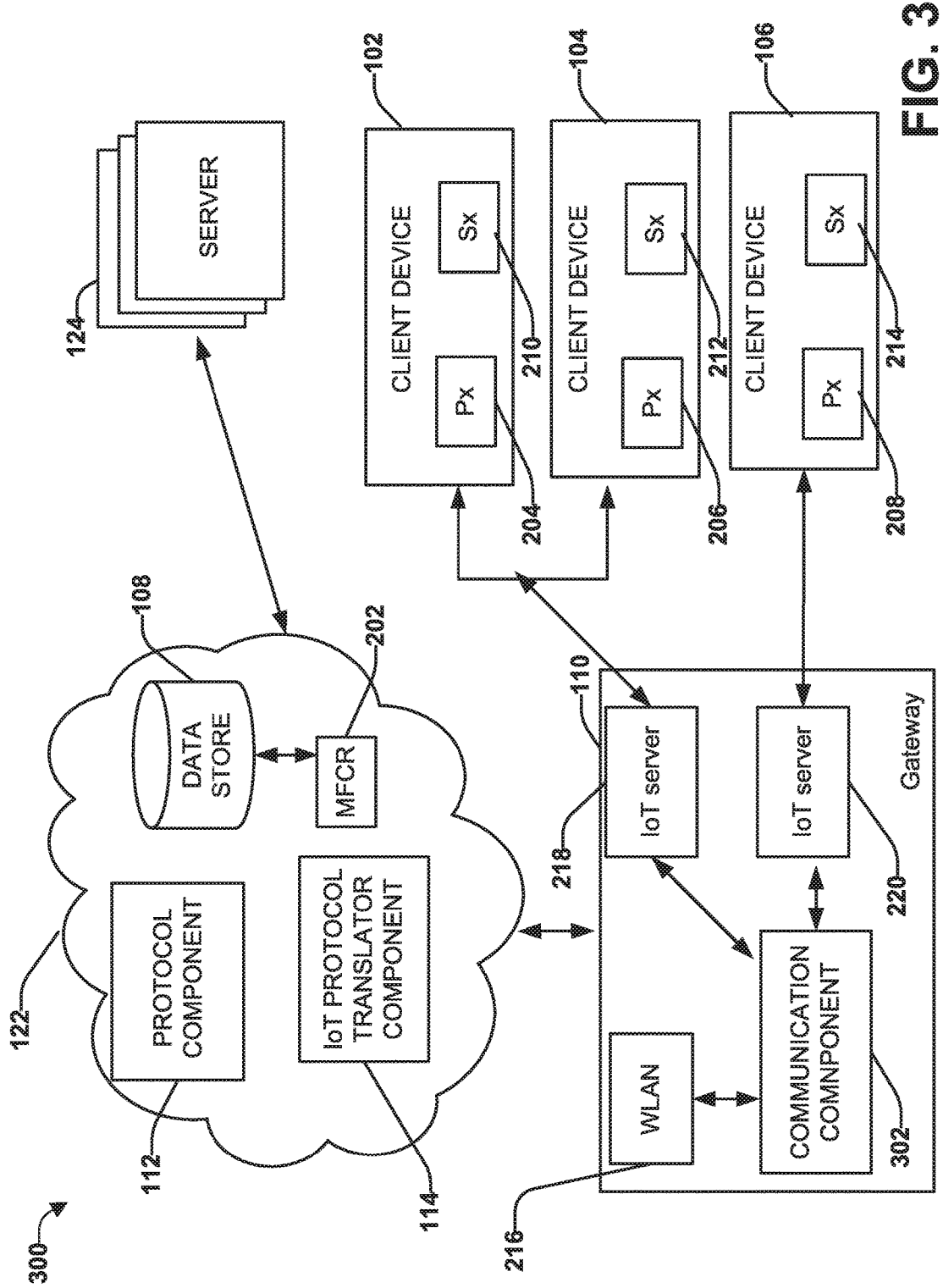
FIG. 3 is another block diagram of a wireless network with IoT protocol translation components according to various aspects.

However in other aspects, (e.g., as shown in FIG. 3), the IoT protocol translator component 114 can be located in a cloud 122 and comprise IoT protocol-specific PHY layers (in the home gateway 110 as the IoT protocol translator component 114, as illustrated), while the IoT protocol-specific upper layers as MAC and LLC can be moved to the protocol component as a part of the IoT protocol translator component in the cloud 122. Both components can operate in conjunction as one IoT protocol translator system, and depending on the particular architecture of the IoT home network, both components can reside together (e.g., both in the cloud 122 or within a home gateway device 110), or separately in communication.

In an embodiment, the IoT protocol component 114 can be configured to translate communications in the plurality of different communication protocols into an IoT protocol based on the translator dataset or data store 108, which can include a look-up table mapping of parameters (functions, variables, units, categories, rules, as well as other semantics) and the relationships of these parameters among different protocols to IoT protocols for the home and their updated information/data. The data store 108 can comprise different datasets as part of a look-up table that enables translation from manufacturer protocols to IoT protocols, and vice versa, as a function of the relationships between standardized and proprietary parameters and any IoT parameters.

The IoT protocol component 114 can further process the communications in the IoT protocol to the plurality of client devices 102-106, where these communications can be further processed, un-encapsulated, or implemented as settings, sensor controls, or to trigger feedback from the client devices 102-106, for example. All of the client devices 102-106, despite being configured according to different manufacturer protocols, can process communications in the IoT protocols as similar or different IoT protocols, for example, as result of communications translations and the mapped parameters via the protocol component 112 and the IoT translator protocol component 114.

The IoT protocol component 114, for example, can translate communications from one or more manufacturing severs 124 into the IoT protocol for all the client devices 102-106 to apply or store with different IoT protocols/various different manufacturing protocols corresponding to each client device 102-106. Likewise, communications from the client devices 102-106 can be translated into one or more of the different manufacturer protocols or standardized protocols corresponding to one or more manufacturer servers 124 or associated protocol parameters, which can be standardized protocol parameters according to a standardizing body or not, for example. As such, communications (e.g., from a client device of different protocol, either by proprietary/standard protocol/format or IoT protocol/format to another different client device of another protocol, or from server 124 to client device 102 with different corresponding manufacturer protocols differing from the IoT protocol) can be enabled by the translation of manufacturer proprietary/standardized protocols (with corresponding parameters/semantics) into an IoT protocol by the IoT translation protocol component 114 for communication to or protocol translation for all client devices 102-106. The translation into an IoT protocol can be for one IoT protocol, or different IoT protocols for the client devices 102-106 to process corresponding to different manufacturers and communicate to one another via the gateway 114 or the IoT protocol translator component 114.

In an aspect, the client devices 102-106 can be configured to correspond with or operate according to different manufacturing protocols from one another. The client device communications of each of the client devices 102-106 can be confined to a particular IoT protocol, a particular manufacturer protocol or both, in which translations of protocols can be made from among client devices with different IoT protocol semantics/parameters and different servers 124 and IoT client devices 102-106 that correspond to different manufacturer protocols and their related semantics or parameters. The communications within the network 100 can thus include different types of data based on the direction of communication (client device 102-106 to server 124, cloud network storage 122, or other target device, vice versa—from server 124 to client device, or among client devices).

Each manufacturer server 124 can have secured access to the cloud data store 108 via the protocol component 112 and operate to update respective parameters associated with their proprietary protocols in order to communicate to all devices of a home via translated communications into the home network IoT protocol, as well as these client devices 102-106 communicating in return. In one example, the communication from a client device (e.g., 102) to a server 124 via the gateway 110 can comprise protocol data (e.g., a parameter, semantic or related data) as status data with a specified format for status data (or sensory status data) as well as related semantics—what kind of status data parameter, which data unit and which data granularity—that can be manufacturer-specific and differ among corresponding manufacturer servers 124. This status data, for example, can be related to or for a particular manufacturer or manufacturer protocol (e.g., Zigbee, Z-Wave, etc.) associated with the IoT protocol of a particular client device 102 or all IoT client devices 102-106.

In one aspect, status data can include a coding or a coding format/protocol/protocol data (e.g., encapsulation rule) as designating a sensed physical property such as a temperature change as a temperature increase, in which the communication can be a current or a last report as 0.1° C., while a different manufacture can be coding a communication as a temperature decrease since last report in 0.5° F. Both communications can be expressing a similar or same property (e.g., temperature), but be encoded or formatted differently to indicate such physical parameter or category being communicated (in the same IoT protocol, different IoT protocol, different manufacturer protocol as compared to other client devices 102-106). This encoding or format can come in the form of an encapsulation rule or format for payload or packet data, or can be considered as a function or relationship over time or to another variable, such as a direction of increase or decrease. These parameters or formats can differ among different protocols associated with different manufacturers in how they are expressed. Further, the data unit can be the unit of measure such as in Fahrenheit or Celsius, for example, or other unit of data related to a physical property, while the data granularity can be a number or increment as 0.1, 0.05 or other amount/change/measured value, for example.

In another embodiment, the protocol data can include control data and an associated format for such data that is communicated from server 124, manufacturer, or the gateway device 110 to any number of the client devices 102-106. For example, a parameter can be updated, or provided with its format for control data from a particular manufacturer server 124 associated with a particular manufacturer protocol to the gateway 110. The protocol component 112 can update the parameter in the data store 108 and further communicate the update to the client devices 102-106 or enable further communications to be translated by the IoT protocol translator component 114 based on a mapping of the updated parameter to an IoT protocol parameter with the data store 108. The communications could indicate similar or same data, but as a result of different protocol rules or formatting a decrease or function of the change, as well as the unit of measure or granularity could be different. The IoT protocol translator 114 can thus operate to map the various protocol rules as they related to standards promulgated by standard bodies, between manufacturers within those standards, or different manufacturer standards, which can subsequently be used for translating ongoing or future communications between the client devices 102-106 and servers 124.

Control data can be delivered from server 124 to client device 102-106 and include protocol data including parameters or semantics—what kind of control data parameter, data unit (e.g., a unit of measure) and data granularity. As with status data, a parameter can be manufacturer-specific, in which one manufacturer protocol includes coding for a particular physical property (e.g., coding for gas injection change). The control data can provide for a gas increase since last report in 0.1 liters, while a different manufacturer can have coding as gas decrease since last report in 0.01 gallons. The communications could indicate similar or same data, but as a result of different protocol rules or formatting a decrease or function of the change, as well as the unit of measure or granularity could be different. The IoT protocol translator 114 can thus operate to map the various protocol rules as they related to standards promulgated by standard bodies, between manufacturers within those standards, or different manufacturer standards, which can subsequently be used for translating ongoing or future communications between the client devices 102-106 and servers 124.

In another aspect, the protocol data can include forwarding data and a parameter for forwarding data to a particular device, bridge, client or target client. The IoT protocol translator component 114 can then receive indications of the forwarding data with a parameter and its format for data forwarding of a bridge client from/to a target client (e.g., any one of 102-104) to/from a server 124. This protocol data can also include a client device address, a server device address, a client's data encapsulation rule, or a server's data encapsulation rule, for example.

Referring to FIG. 2, illustrated is another example of an IoT network 200 enabling protocol translations of communications with client devices in an IoT network area. The system 200 enables communications with a plurality of client devices 102-106 that are communicatively coupled in an IoT network of a home, a building, a specified location, geographic area or other similar network structure/set of boundaries, in which each of these client devices can communicate in a same IoT protocol or IoT protocols that are different with respect to rules or parameters of interpretation, for example, or different with respect to entirely different manufacturer protocols, either separately or in conjunction with an IoT protocol for being communicatively coupled within an IoT network.

In an example, an IoT network 200, the data store 108 and the protocol component 112 can reside or be centrally located within a cloud network server or cloud and data component 122 as separate components or one component, for example. The gateway device 110 and the components 108, 112 and 114 can operate for translating and managing data, functions or sensed data from sensors 210-214 of the client devices 102, 104, and/or 106, such as power consumption, temperature, other settings, or parameters related to a physical property within a household or geographic area of the IoT network 100. The client devices 102-106 can also include processors 204-208 for processor or generating communications via the gateway device 110 to one another or additional servers, either IoT servers 218 or 220 communicatively coupled to the gateway 110 or manufacturer servers 124.

The gateway device 110 can be operatively connected, for example, to each of client devices 102-106. As stated above, the client devices 102-106 can correspond to one or more IoT protocols, which can be similar in format or in similar protocol parameters, can differ in other protocol information or data, such as specific to a type of device or particular manufacturer/manufacturer server 124, for example. Additionally or alternatively as state above, the client devices 102-106 can include manufacturer-specific or proprietary protocols specific to a manufacturer of the client device 102-106.

The gateway device 110 can include a processor (not seen) or IoT server components 218-220, which can be configured to selectively receive or transmit signals to the client devices 102-106 respectively in response to translated protocols parameters and according to one or more IoT protocols. The client devices 102-106, in turn, can be operable to manipulate a powering of the power consuming features/functions thereof, or other setting (temperature, pressure, flow, or other property related to the sensors 210-214) in response to the communications from the gateway device 110. Further, the sensors 210-214 can provide sensory status data to the gateway device 110 for further processing and communication to a manufacturer or a manufacturer server 124, for example, or the cloud server/component 122 for storage in a data store 108 via the protocol component 112.

The IoT protocol translator component 114 further translates communications back and forth between different client devices 102-106 and the network 122 for further communication to servers 124. The WLAN device 216 can operate to communicate various communications (e.g., sensor status data, control data, forwarding data, or other communication data). Thus, IoT protocol translator 114 of the gateway 110 can map data from the one or more IoT servers 218-220 to various different protocols based on a look-up table at the data store 108 and relationships between different protocol parameters from among one another for interpreting the data according to type, data unit or granularity as well as between IoT protocols and the manufacturing protocols. In order to further communicate sensor data from a client devices corresponding to a manufacturer protocol with a different manufacturer protocol the translation from IoT to the different manufacturer protocol uses the relationship in the look up table. For example, a decrease in a change in one can be determined as an increase in change for another. Likewise, data units or units of measure can be different and be converted, unit increments rounded or mathematically operated in order to comply or be uniform after the translation. These functions can all be updated and controlled in the data store 108 via the protocol component 112 and implemented by the IoT protocol translator component 114 by being communicatively coupled to the protocol component 112 or data store 108 in the cloud or cloud and data server 122, for example.

The gateway device 110 can be configured to communicate with, control or operate the devices 102, 104, and 106, which can comprise appliances, thermostat controllers, or other smart or non-smart (without micro) devices of a home. In one embodiment, the gateway device 110 can operate in response to commands (e.g., control data) that are received for controlling the various devices 102, 104, and 106. Such control data can alter a setting for a power consuming feature or function of the devices 102, 104, and 106, as discussed above.

In another embodiment, the protocol component 112 as located in the cloud server 122 or elsewhere can comprise a manufacturer-specific protocol component 202 that operates to receive and control updated data specifically from one or more different manufacturers or manufacturer servers 124, which can comply with proprietary updates or protocol communication parameters, for example, which could be different from standardized formats or protocols, or not covered by such standards. These parameter updates can be distinguished from a standardized protocol specific to the manufacturer protocols and involved techniques (e.g., encapsulation, protocols, formats, or the like) that could not be standardized or specifically defined by any standardized protocol, as well as different datasets maintained according to particular manufacturer servers 124 in order to be securely accessed, updated, and implemented for communication among IoT client devices associated with various manufacturers or manufacturer protocols independently. As such, the client devices 102-106 could be compliant with the translated IoT protocols and their respective manufacturer, but not necessary other protocols of other manufacturer servers 124, for example. The manufacturer specific parameters can also be integral to a standardized protocol or a different proprietary protocol or set of process (algorithms) corresponding uniquely to a manufacturer communication protocol or server component 124 for communication with one or more particular client devices 102, 104, which can be different from a communication protocol of another client device 106, for example.

Referring now to FIG. 3, illustrated is another example of an illustrated IoT network translator system 300, similar to the systems above, which enables protocol translations of communications with client devices in an IoT network area, such as within a home or structure. The protocol component 112 can be communicatively coupled to the IoT protocol translator component 114 within the cloud and data component/network server 122. Both components of the translator system (e.g., the protocol component 112 and the IoT protocol translator component 114) can reside in a cloud server that operates remoted from a building or home to translate protocol communications being processed or generated via the gateway device 110.

The communications can be transmitted and received via the communication component 302. For example, the communication component can be configured to receive status data based on one or more sensors from the plurality of client devices and communicate the status data to the protocol component at a cloud server to be stored at the translator dataset and accessible via different manufacturer servers, process control data that has been translated into the IoT protocol from the network cloud device or server 122, and from among different client devices 102-106, which can be configured according to one or more different manufacturer protocols (e.g., ZigBee/IoT protocol corresponding to client device 102, and Z-Wave/IoT protocol corresponding to client device 104. Other communication protocols can include, as discussed above for example, digital enhanced cordless telecommunication—ultra low energy (DECT-ULE) protocols/standards as standardized by the European Telecommunications Standards Institute (ETSI), bluetooth 4.2 for low energy mode (IEEE 802.15.1), Z-Wave (by ITU G.9959), ZigBee (by IEEE 802.15.4), Enocean (by ISO/IEC 14543-3-10), 802.11ah, also called Wi-Fi HaLow, LoRa as defined by lora-alliance, as well as ongoing protocols or future protocols, which may be in conjunction with 5G mobile networks or other wireless technologies (e.g. light communication or wireline technologies derived by G3-PLC), for example.

The communication component 302 can include one or more processor, receiver or transmitter circuitry for generating or processing communications along a transmit/receive pathways. The WLAN 216 can operate to enable access to the home network and client devices 102-106 by the data and computing cloud or cloud server device 108 generate a storage cloud or memory wirelessly for the gateway device 110 and client devices 102-106 as the home network.

The IoT protocol translator component 114 discussed herein can be included with or separate from the PHY layer that communicates to upper layers in an OSI model for further communication to network servers, routers or cloud based applications outside of the home network, such as the servers 124 that can correspond to one or more different manufacturers and their proprietary/standardized communication protocols. Here, the PHY layer can reside within the communication component 302 or the gateway 110, while the the media access MAC, and the LLC layer can reside or be integrated within the IoT protocol translator 114 and the protocol component 112 together. The PHY layer, MAC layer, LLC layer can be IoT protocol-specific and controlled or integrated with the IoT protocol translator component 114, which is different from being manufacturer-specific. OSI layers above LLC could be manufacturer-specific or manufacturer server 124 controlled or comprised as operatively controlled or integrated as part of the manufacturer-specific protocol component 202 or the manufacturer servers 124. In other aspects, (as shown in FIG. 3) the IoT protocol translator component 114 can be located in a cloud network device 122 configured to generate a cloud storage.

In another aspect, another exemplary translation between Z-Wave and ZigBee can be illustrated according to figures herein, in which one client device (or group of client devices) 102 can be operate or correspond to a Z-Wave protocol and another client device (or group of client devices) 104 can correspond to a ZigBee protocol. The translation, for example, can be with respect to communications regarding a particular physical parameter or property and the IoT protocol translation component 114 can translate the communications by utilizing the relationship look-up or other translation data sets controlled by the protocol component 202.

According to section 4.4.1 of the ZigBee multi-sensor device manual corresponding with sensor device 214 and according to section 4.4.2.2.1 of the ZigBee Cluster Library, the measured temperature (as the data category, class or type) can be reported via a cluster id 0x0402 (or set of bits) and an Attribute (e.g., a property) with an identification or Id# 0x0000 reports MeasuredValue (e.g., as a field or data type) with the Signed (plus or minus) 16-bit Integer type Sint16, with an encoding in multiple of 0.01° C., with a valid range from −273.15° C. to 327.67° C. and with a special value 0x8000 indicating that the temperature measurement is invalid. The combination of these parameters can represent a particular formatting/protocol as well as units of measure or data units, and particular granularities as part of the formatting/protocol. For the IoT protocol translator component 114, this protocol data can be called or filed in a dataset as part of look-up table as TEMPzb, for example, or organized/identified under a different name or category as stored within the data store 108, for example. In contrast or in addition, according to the Z-Wave multi-sensor device manual corresponding to sensor device 212, the measured temperature can be reported in tenths of a degree Fahrenheit. For the IoT protocol translator component 114, this can be called TEMPzw or organized and identified under a different name or category as stored within the data store 108, for example.

From a Z-Wave temperature value to a ZigBee temperature value, the IoT protocol translator component 114, for example, can execute the following calculation with the data, variables or parameters being updated or controlled via the protocol component 112 in the data store 108:

$$TEMPzb=\text{Dec-to-Sint16}(\max(\min((\text{Sint16-to-Dec}(TEMPzw)/10-32)*500/9,327.67),-273,15)).$$

From ZigBee temperature value to Z-Wave temperature value, the IoT protocol translator component 114, for example, can execute the following calculation for translation, for example:

$$TEMPzw=\text{Dec-to-Sint16}(\text{Sint16-to-Dec}(TEMPzb)*9/50+320).$$

As such, the IoT protocol translator component 114 operates to translate among different protocols having been standardized and stored according to format, data category, data units or units of measure, granulator, relationship, or other parameters or variables related to the particular protocol and enabling a seamless communication in an IoT network that dynamically can be updated based on updated standards or updated manufacturer parameters, for example.

Figure 4:
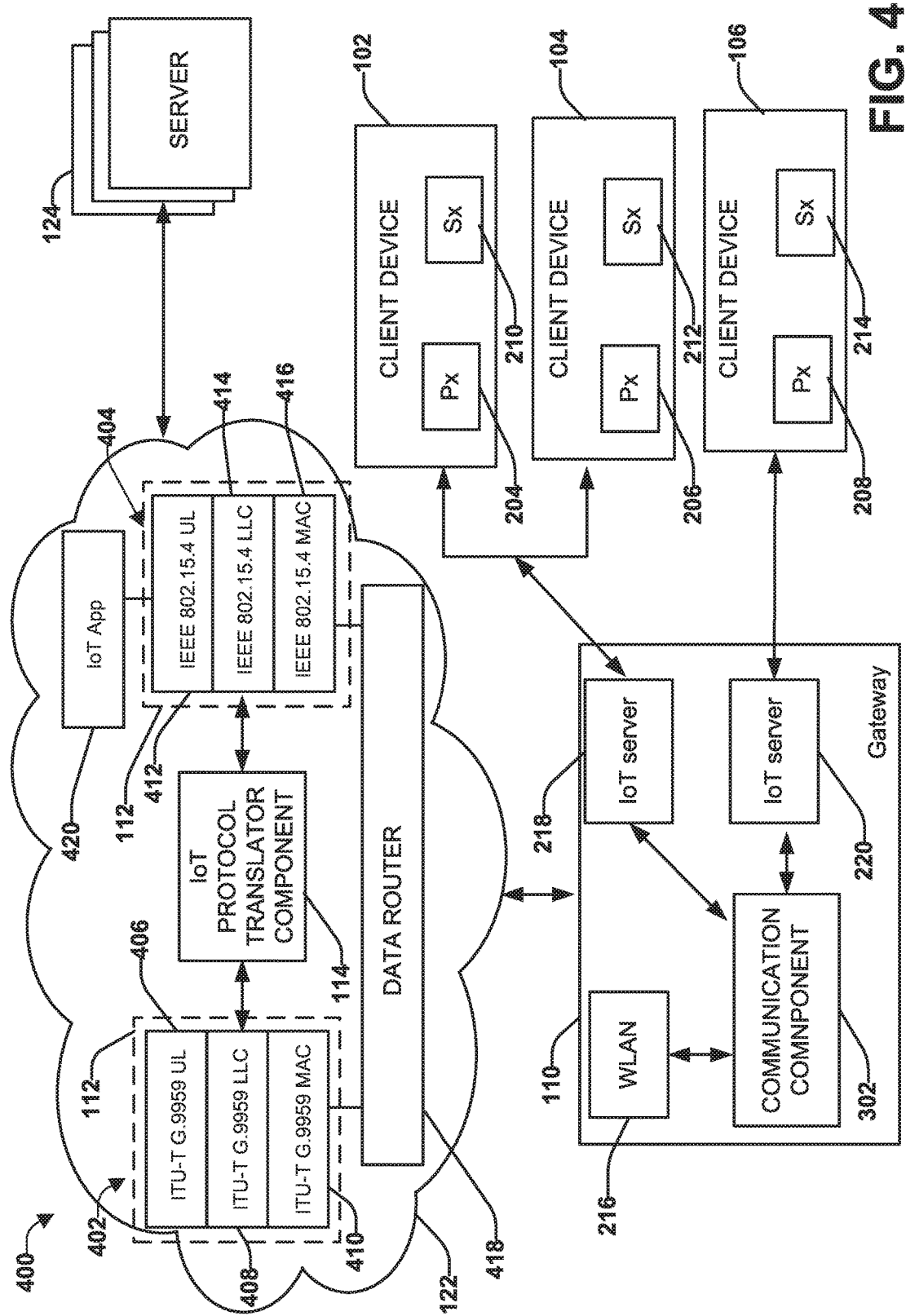
FIG. 4 is another block diagram of a wireless network with IoT protocol translation components according to various aspects.

Referring to FIG. 4, illustrated is another example of an illustrated IoT network translator system 400, similar to the systems above, which enables protocol translations of various different protocols in an IoT network area. As stated above, the components illustrated in the cloud or cloud server device 122 generating cloud storage can also be located in the home gateway 110, an IoT gateway, or other network device. The IoT protocol translator component 114, which can be communicatively coupled to the protocol component 112, can also be included with the communication component 302 with a PHY layer at a home device that can communicate to upper OSI layers (UL) for further communication to network servers, routers 418 or cloud based applications 420 outside of the home network.

The protocol translator component 112 can comprise various communication layers/modules/components that operate according to protocol stacks 402 and 404, which can correspond or be associated with one or more different protocols for different manufacturer servers, respectively. The MAC layers 410 and 416, and the LLC layers 408 and 414 can operate within the protocol component 112 with upper OSI communication layers (UL) 404 and 412 as part of the stacks 402, 404.

In one example the protocol stacks (e.g., 404) can include IoT protocol-specific components that operate with an IoT application 420 (such as a set of processes or operations to be performed or communicated for processing in a processor). The IoT protocols being utilized for different client devices 102-106 can also different from one another in various semantics, be configured differently according to particular manufacturer protocol/manufacturer server 124 associations, or both. Although the protocol stacks 402, 404 of communication layers/components can also differ from one another in IoT protocol, communications therebetween can also be translated via the IoT protocol translator component 114, along with the different manufacturer protocols from the servers 124 with one or more particular IoT protocols. The UL components 404 and 412 above LLC layers 408, 414 could be manufacturer-specific, manufacturer server 124 controlled or comprised as part of the protocol component 112.

In other aspects, the IoT protocol translator component 114 can be located in a cloud 122 and further comprise IoT protocol-specific PHY layers (in the home gateway 110 as the IoT protocol translator component 114, while the IoT protocol-specific upper layers as MAC and LLC can be moved to the protocol component as a part of the IoT protocol translator component in the cloud 122. Both components can operate in conjunction as one IoT protocol translator system, and depending on the particular architecture of the IoT home network, both components can reside together (e.g., both in the cloud 122 or within a home gateway device 110), or separately in communication.

Figure 5:
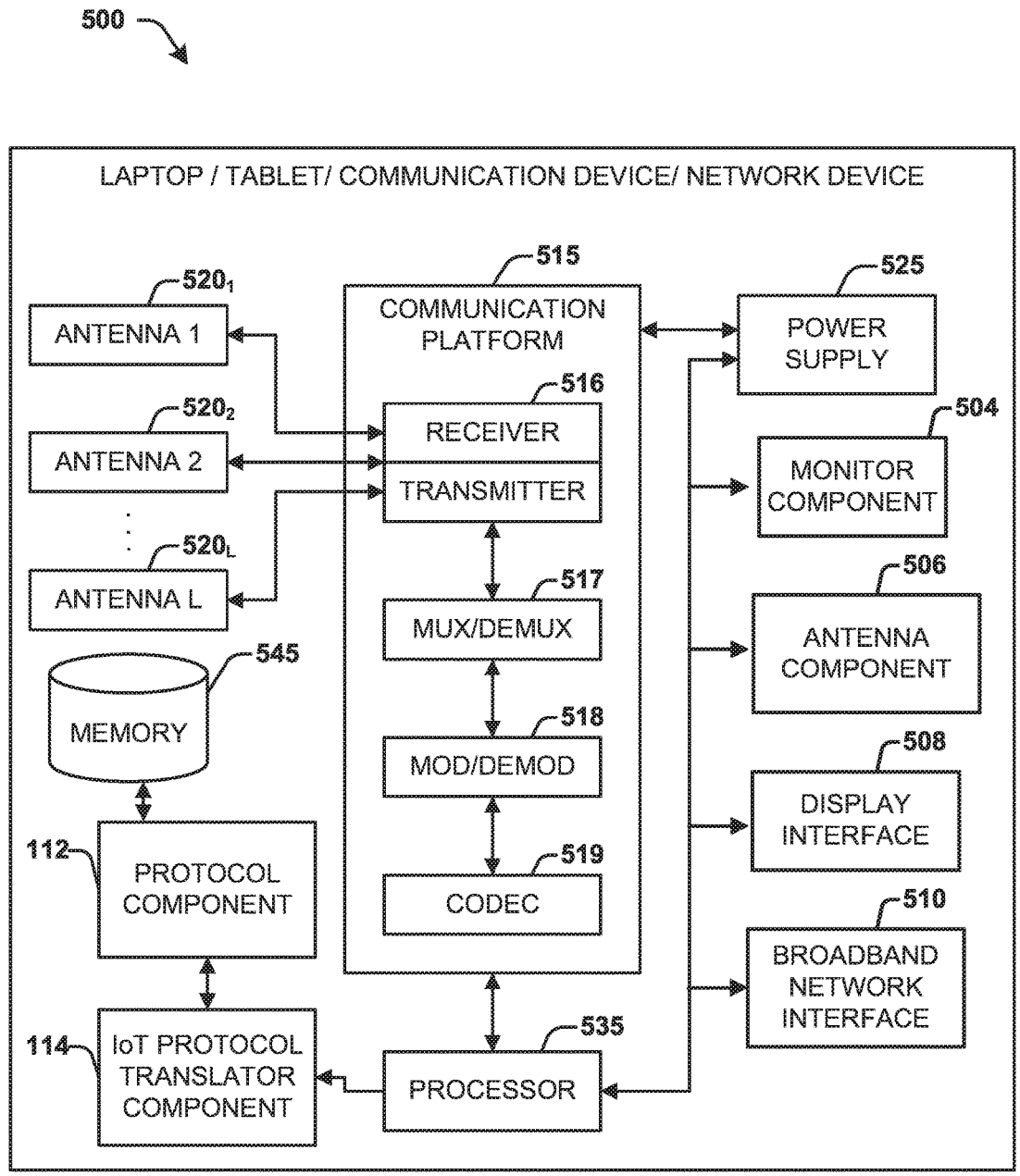
FIG. 5 is an exemplary wireless terminal for utilizing the various aspects described.

In order to provide further context for various aspects of the disclosed subject matter, components, modules, network devices, or other circuitry or system layers herein, FIG. 5 illustrates a non-limiting example of a computing device, such as a laptop, tablet, or other communication device or wireless terminal 500 that can implement some or all of the aspects described herein. In an aspect, wireless terminal, such as a laptop, tablet, other communication device, or wireless terminal 500 can receive and transmit signal(s) to and/or from wireless devices such as APs, access terminals, wireless ports and routers, or the like, through a set of L antennas 520, which can be configured according to one or more embodiments or aspects described herein. In one example, antennas 520 can be implemented as part of a communication platform 515, which in turn can comprise electronic components and associated circuitry and/or other means that provide for processing and manipulation of received signal(s) and signal(s) to be transmitted. The antennas 520 can comprise the various antenna elements incorporating the different aspects or embodiments disclosed herein. In one example, the antennas 720 can be located along an edge or side 720 of the wireless terminal 500, which can be within a same quadrant, section, portion or subset of the volume of the mobile device, opposing or different sections, for example.

In an aspect, communication platform 515 can include a monitor component 504 and antenna component 506, which can couple to communication platform 515 and include electronic components with associated circuitry that provide for processing and manipulation of received signal(s) and other signal(s) to be transmitted. The communication platform 515 can further comprise a receiver/transmitter or transceiver 516, which can transmit and receive signals and/or perform one or more processing operations on such signals (e.g., conversion from analog to digital upon reception, conversion from digital to analog upon transmission, etc.). In addition, transceiver 516 can divide a single data stream into multiple, parallel data streams, or perform the reciprocal operation.

Additionally, the communication device 500 can include display interface 508, which can display functions that control functionality of the device 500, or reveal operation conditions thereof. In addition, display interface 508 can include a screen to convey information to an end user. In an aspect, display interface 508 can be a liquid crystal display, a plasma panel, a monolithic thin-film based electro chromic display, and so on. Moreover, display interface 508 can include a component (e.g., speaker) that facilitates communication of aural indicia, which can also be employed in connection with messages that convey operational instructions to an end user. Display interface 508 can also facilitate data entry (e.g., through a linked keypad or through touch gestures), which can cause access equipment and/or software 500 to receive external commands (e.g., restart operation).

Broadband network interface 520 facilitates connection of access equipment and/or software 500 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 510 can be internal or external to access equipment and/or software 500, and can utilize display interface 508 for end-user interaction and status information delivery.

Processor 535 can be functionally connected to communication platform 508 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 535 can be functionally connected, through data, system, or an address bus, to display interface 508 and broadband network interface 510, to confer, at least in part, functionality to each of such components.

In another example, a multiplexer/demultiplexer (mux/demux) unit 517 can be coupled to transceiver 516. Mux/demux unit 517 can, for example, facilitate manipulation of signal in time and frequency space. Additionally or alternatively, mux/demux unit 517 can multiplex information (e.g., data/traffic, control/signaling, etc.) according to various multiplexing schemes such as time division multiplexing (TDM), frequency division multiplexing (FDM), orthogonal frequency division multiplexing (OFDM), code division multiplexing (CDM), space division multiplexing (SDM), or the like. In addition, mux/demux unit 517 can scramble and spread information according to substantially any code generally known in the art, such as Hadamard-Walsh codes, Baker codes, Kasami codes, polyphase codes, and so on.

In a further example, a modulator/demodulator (mod/demod) unit 518 implemented within communication platform 515 can modulate information according to multiple modulation techniques, such as frequency modulation, amplitude modulation (e.g., L-ary quadrature amplitude modulation (L-QAM), etc.), phase-shift keying (PSK), and the like. Further, communication platform 515 can also include a coder/decoder (codec) module 519 that facilitates decoding received signal(s) and/or coding signal(s) to convey.

According to another aspect, wireless terminal 500 can include a processor 535 configured to confer functionality, at least in part, to substantially any electronic component utilized by wireless terminal 500. As further shown in system 500, a power supply 525 can attach to a power grid and include one or more transformers to achieve a power level at which various components and/or circuitry associated with wireless terminal 500 can operate. In one example, power supply 525 can include a rechargeable power mechanism to facilitate continued operation of wireless terminal 500 in the event that wireless terminal 500 is disconnected from the power grid, the power grid is not operating, etc.

In a further aspect, processor 535 can be functionally connected to communication platform 515 and can facilitate various operations on data (e.g., symbols, bits, chips, etc.), which can include, but are not limited to, effecting direct and inverse fast Fourier transforms, selection of modulation rates, selection of data packet formats, inter-packet times, etc. In another example, processor 535 can be functionally connected, via a data or system bus (e.g., a wireless PCIE or the like), to any other components or circuitry not shown in system 500 to at least partially confer functionality to each of such components, such as by the antenna systems disclosed herein.

As additionally illustrated, a memory 545 can be used by wireless terminal 500 to store data structures, code instructions and program modules, system or device information, code sequences for scrambling, spreading and pilot transmission, location intelligence storage, determined delay offset(s), over-the-air propagation models, and so on. Processor 535 can be coupled to the memory 545 in order to store and retrieve information necessary to operate and/or confer functionality to communication platform 515 and/or any other components of wireless terminal 500.

Further, the antenna systems described above with the communication device 500 can also be configured, for example, to operate at a wide range of frequencies in a high band frequency range additionally include peer-to-peer (e.g., mobile-to-mobile) ad hoc network systems often using unpaired unlicensed spectrums, 802.xx wireless LAN, BLUETOOTH and any other short- or long-range, wireless frequency ranges and communication techniques. The narrow band antenna elements disclosed herein, such as antennas resonating systems of devices disclosed, for example, can also be configured to operate at other frequency ranges also.

In other examples, the antenna elements 206 or 208 can operate to communicate wirelessly with other components, such as the display interface 508 as a wireless device, or with other wireless interfaces, such as a wireless USB device, for example. For example, a wireless USB device can communicate within a 3.1 to a 10.6 GHz frequency range. In addition, the antenna systems disclosed can be configured to communicate with other wireless connections, components, interfaces or devices in order to provide communication interfacing for wireless component-to-component communications. For example, a PCB to PCB interface can be facilitated by the high band antenna systems as well as micro millimeter wave communications among one or more internal or external components. Other communication interfaces can also be facilitated by the antenna elements disclosed such as an internet of things (IoT) to IoT components, wearable components, mobile to mobile, a network base station (e.g., a macro cell network device, femto cell device, pico cell device or other network devices) or any combination thereof to communicate via one of more of the antenna elements, such as via the antenna system or devices herein, for example. Additional other examples are also envisioned by which the antenna systems disclosed herein can operate in different frequency ranges, as well as communication and facilitate communications with, or among, one or more wireless components or devices. For example, industrial, scientific and medical (ISM) radio bands, radar band widths, or other ranges of a frequency spectrum can also be facilitated for communications by the antenna systems being disclosed.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 6:
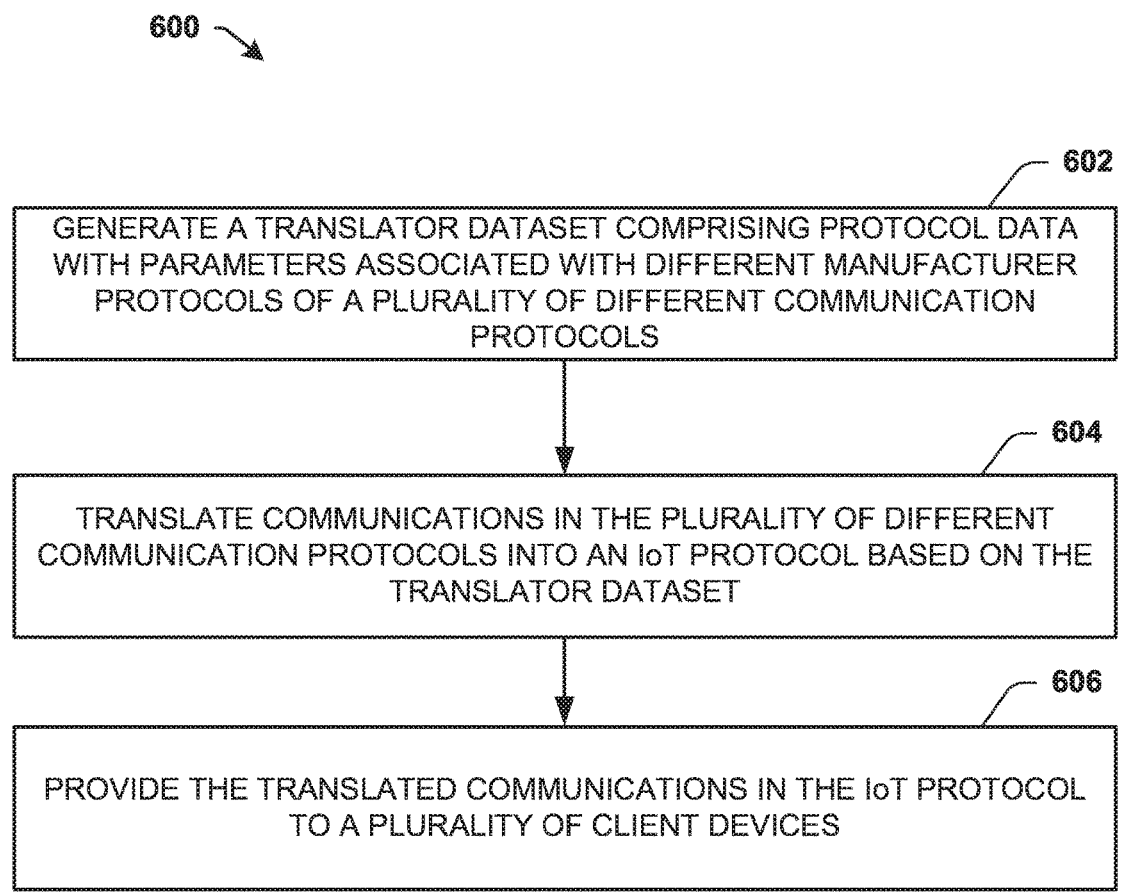
FIG. 6 is a process flow of a method for mobile device with an antenna system disclosed in accordance with various aspects or embodiments herein.

Referring to FIG. 6, illustrated is a method 600 employed in gateway device or other network device (e.g., home gateway, IoT-specific gateway, multi-protocol repeater, data/computing cloud device or server) for a protocol handler or protocol translator. The method 600 initiates and at 602 includes generating a translator dataset comprising protocol data with parameters associated with different manufacturer protocols of a plurality of different communication protocols.

At 604, the method further comprises translating (e.g., via protocol component 112 and IoT protocol translator component 114) communications in the plurality of different communication protocols into an IoT protocol based on the translator dataset (e.g., 108).

At 606, providing the translated communications in the IoT protocol to a plurality of client devices (e.g., 102-106) (e.g., via protocol component 112 and IoT protocol translator component 114).

In other aspects, the method 600 can include receiving a parameter related to at least one of the plurality of different manufacturer protocols from a corresponding manufacturer server device (e.g., 124). The IoT component 114, for example, can map the parameter to an IoT parameter of the IoT protocol within the look up table (e.g., the data store 108) for storing, or dynamically to translate communications dynamically or on the fly. The look-up table can include the translator dataset (e.g., an associated/corresponding data store secured for communication with a particular manufacturer server). The data store 108 or data set there in as part of a look-up table can also comprises one or more dictionary and translation rules corresponding to at least one of the plurality of different communication protocols in relation to the IoT protocol. Utilizing the data set therein, the IoT protocol translator component 108 can thus generate a communication in the IoT protocol based on the IoT parameter to the plurality of client devices, which correspond respectively to different protocols (different IoT protocols, Z-Wave, ZigBee, etc.).

Examples may include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a protocol handler system employed with an internet of things (IoT) network, the protocol handler system comprising: a protocol component configured to control a translator dataset comprising protocol data of a plurality of different communication protocols; and an IoT protocol translator component, communicatively coupled to a plurality of client devices, configured to translate communications in the plurality of different communication protocols into an IoT protocol based on the translator dataset and process the communications in the IoT protocol with the plurality of client devices.

Example 2 includes the subject matter of Example 1, wherein the protocol component comprises a manufacturer-specific protocol component configured to receive an updated parameter associated with a manufacturer protocol of the plurality of different communication protocols in the translator dataset, and update the translator dataset with the updated parameter based on the plurality of different communication protocols for different manufacturers.

Example 3 includes the subject matter of any of Examples 1-2, including or omitting any elements, wherein the protocol component or the IoT protocol translator component is further configured to map the protocol data and the updated parameter to the IoT protocol to generate the communications to the plurality of client devices based on the protocol data and the updated parameter.

Example 4 includes the subject matter of any of Examples 1-3, including or omitting any elements, wherein the IoT protocol translator component is further configured to transmit the protocol data or the updated parameter in the IoT protocol to the plurality of client devices, the protocol data comprising control data that changes a property or a setting of one or more sensors of the plurality of client devices, and wherein the control data includes a manufacturer parameter derived from a manufacturer protocol related to the plurality of different communication protocols, a unit of measure and a data granularity.

Example 5 includes the subject matter of any of Examples 1-4, including or omitting any elements, wherein the IoT protocol translator component is further configured to communicate a first updated parameter of a first communication protocol to a first client device of the plurality of client devices in the IoT protocol, and communicate a second updated parameter related to a second communication protocol that is different from the first communication protocol to a second client device of the plurality of client devices in the IoT protocol.

Example 6 includes the subject matter of any of Examples 1-5, including or omitting any elements, wherein the protocol component is further configured to receive an updated parameter within a cloud server and process the updated parameter to the translator dataset, and the IoT protocol translator component is further configured map the updated parameter to the IoT protocol based on a look-up table with the translator dataset.

Example 7 includes the subject matter of any of Examples 1-6, including or omitting any elements, further comprising: a home gateway device with one or more processors comprising the IoT protocol translator component and a communication component coupled to the IoT protocol translator component, configured to receive status data based on one or more sensors from the plurality of client devices and communicate the status data to the protocol component at a cloud server to be stored at the translator dataset and accessible via different manufacturer servers.

Example 8 includes the subject matter of any of Examples 1-7, including or omitting any elements, wherein the IoT protocol translator component is further configured to receive status data from a first client device of the plurality of client devices and communicate the status data to a second client device of the plurality of client devices, the protocol component, or to both the second client device and the protocol component.

Example 9 includes the subject matter of any of Examples 1-8, including or omitting any elements, wherein the first client device and the second client device comprise different IoT protocols based on the different manufacturers, and the status data comprises a sensor information related to a property or a setting of a client device of the plurality of client devices that is associated with a manufacturer protocol of the plurality of different communication protocols, a unit of measure and a data granularity that is associated with the sensor information.

Example 10 includes the subject matter of any of Examples 1-9, including or omitting any elements, wherein the IoT protocol translator component comprises a physical layer of a communication protocol stack, and the protocol component, communicatively coupled to the IoT protocol translator component, comprises a media access control layer and a logical link control sublayer.

Example 11 includes the subject matter of any of Examples 1-10, including or omitting any elements, wherein the IoT protocol translator component is further configured to receive forwarding data from a client device of the plurality of client devices to communicate to the protocol component, wherein the protocol component is further configured to deliver data or the communications to a target device via a server or bridge client that is a different protocol than a protocol corresponding to the client device based on the forwarding data, wherein the forwarding data comprises at least one of a client device address, a server device address, a client device encapsulation rule, or a server data encapsulation rule.

Example 12 is a method for a protocol handler system comprising: generating, via one or more processors, a translator dataset comprising protocol data with parameters associated with different manufacturer protocols of a plurality of different communication protocols; translating, via the one or more processors, communications in the plurality of different communication protocols into an IoT protocol based on the translator dataset; and providing, via the one or more processors, the translated communications in the IoT protocol to a plurality of client devices.

Example 13 includes the subject matter of Example 12, including or omitting any elements, further comprising: receiving a parameter related to at least one of the plurality of different manufacturer protocols from a corresponding manufacturer server device; mapping the parameter to an IoT parameter of the IoT protocol; and generating a communication in the IoT protocol based on the IoT parameter to the plurality of client devices, wherein the plurality of client devices correspond respectively to different protocols corresponding to the plurality of different manufacturer protocols, respectively. \

Example 14 includes the subject matter of any of Examples 12-13, including or omitting any elements, further comprising generating the communication with the IoT parameter to a client device by translating the IoT parameter to a communication protocol associated with the client device, and updating a sensor data of sensors at the client device with the communication.

Example 15 includes the subject matter of any of Examples 12-14, including or omitting any elements, further comprising: in response to receiving control data related to the different manufacturers that comprises an updated parameter, translating the updated parameter into the IoT protocol based on the translator dataset and delivering the control data to the plurality of client devices, wherein the control data changes a property or a setting of the plurality of client devices and includes a category of the updated parameter, a unit of measure and a data granularity.

Example 16 includes the subject matter of any of Examples 12-15, including or omitting any elements, in response to receiving sensor status data from a client device of the plurality of client devices in the IoT protocol, translating the sensor status data into a manufacturer protocol of a manufacturer of the different manufacturers based on the translator dataset, and delivering the sensor status data to a server of the manufacturer, wherein the sensor status data indicates a property or a setting with a status data category, a unit of measure and a data granularity, and the manufacturer protocol is different than another manufacturer protocol that is associated with the client device.

Example 17 includes the subject matter of any of Examples 12-16, including or omitting any elements, further comprising: in response to receiving forwarding data from the client device or the server, delivering the forwarding data to a target device via the server or a bridge client that is a different protocol than a protocol corresponding to the client device or the server, wherein the forwarding data comprises at least one of a client device address, a server device address, a client device encapsulation rule, or a server data encapsulation rule.

Example 18 includes the subject matter of any of Examples 12-17, including or omitting any elements, wherein the translator dataset comprises a set of dictionary and translation rules corresponding to at least one of the plurality of different communication protocols in relation to the IoT protocol.

Example 19 is a system to be employed with an internet of things (IoT) network, the system comprising: a gateway device, communicatively coupled to a plurality of client devices associated with different communication protocols via the IoT network, comprising an IoT protocol translator component configured to enable communications among the plurality of client devices associated with the different communication protocols, and between the plurality of client devices and a plurality of manufacturer servers associated with the different communication protocols; and a protocol component configured to update a look-up table with associations between the different communication protocols and one or more IoT protocols based on first communications from the plurality of manufacturer servers, and enable a mapping of the first communications associated with the different communication protocols with the one or more IoT protocols based on the associations; wherein the IoT protocol translator component is further configured to translate the first communications between the different communication protocols and the one or more IoT protocols based on the look-up table, and translate second communications from a client device of the plurality of client devices to a manufacturer server of the plurality of manufacturer servers that is associated with a different communication protocol than the client device.

Example 20 includes the subject matter of Example 19, wherein the first communications comprise protocol data including one or more parameters associated with one or more updates to the look-up table and corresponding to a manufacturer protocol.

Example 21 includes the subject matter of any of Examples 19-20, including or omitting any elements, wherein the one or more parameters operate to control a property or a setting of at least one of the plurality of client devices and includes at least one of a manufacturer parameter of the manufacturer protocol from at least one of the plurality of manufacturer servers, a unit of measure or a data granularity; wherein the second communications comprise sensory status data from the client device, including at least one of a category of the sensory status data, a sensory data unit, or a sensory data granularity; and wherein the first communications or the second communications further comprise forwarding data comprising at least one of a client device address, a server device address, a client device encapsulation rule, or a server data encapsulation rule.

Example 22 includes the subject matter of any of Examples 19-21, including or omitting any elements, wherein the an IoT protocol translator component of the gateway device comprises a physical layer of a communication protocol stack configured to communicate the first communications and the second communications, and the protocol component, communicatively coupled to the IoT protocol translator, comprises a media access control layer and a logical link control sublayer within a cloud server.

Example 23 is a system for a protocol handler comprising: means for generating a translator dataset comprising protocol data with parameters associated with different manufacturer protocols of a plurality of different communication protocols; means for translating communications in the plurality of different communication protocols into an IoT protocol based on the translator dataset; and means for providing the translated communications in the IoT protocol to a plurality of client devices.

Example 24 includes the subject matter of Examples 23, further comprising: means for receiving a parameter related to at least one of the plurality of different manufacturer protocols from a corresponding manufacturer server device; means for mapping the parameter to an IoT parameter of the IoT protocol; and means for generating a communication in the IoT protocol based on the IoT parameter to the plurality of client devices, wherein the plurality of client devices correspond respectively to different protocols corresponding to the plurality of different manufacturer protocols, respectively.

Example 25 includes the subject matter of any of Examples 23-24, including or omitting any elements, further comprising: means for generating the communication with the IoT parameter to a client device by translating the IoT parameter to a communication protocol associated with the client device, and updating a sensor data of sensors at the client device with the communication.

Example 26 includes the subject matter of any of Examples 23-25, including or omitting any elements, further comprising: means for translating the updated parameter into the IoT protocol based on the translator dataset and delivering the control data to the plurality of client devices, in response to receiving control data related to the different manufacturers that comprises an updated parameter, wherein the control data changes a property or a setting of the plurality of client devices and includes a category of the updated parameter, a unit of measure and a data granularity.

Example 27 includes the subject matter of any of Examples 23-26, including or omitting any elements, further comprising: means for translating the sensor status data into a manufacturer protocol of a manufacturer of the different manufacturers based on the translator dataset, and delivering the sensor status data to a server of the manufacturer, in response to receiving sensor status data from a client device of the plurality of client devices in the IoT protocol, wherein the sensor status data indicates a property or a setting with a status data category, a unit of measure and a data granularity, and the manufacturer protocol is different than another manufacturer protocol that is associated with the client device.

Example 28 includes the subject matter of any of Examples 23-27, including or omitting any elements, further comprising: means for delivering the forwarding data to a target device via the server or a bridge client that is a different protocol than a protocol corresponding to the client device or the server, in response to receiving forwarding data from the client device or the server, wherein the forwarding data comprises at least one of a client device address, a server device address, a client device encapsulation rule, or a server data encapsulation rule.

Example 29 includes the subject matter of any of Examples 23-28, including or omitting any elements, wherein the translator dataset comprises a set of dictionary and translation rules corresponding to at least one of the plurality of different communication protocols in relation to the IoT protocol.

Applications (e.g., program modules) can include routines, programs, components, data structures, etc., that perform particular tasks or implement particular abstract data types. Moreover, those skilled in the art will appreciate that the operations disclosed can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated mobile or personal computing devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media (e.g., one or more data stores) can include, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the acts and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques, such as millimeter wave bands in the range of 30 GHz to 300 GHz, for example.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the acts and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the acts and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. A protocol handler system employed with an internet of things (IoT) network, the protocol handler system comprising:
   a protocol component configured to control a translator dataset comprising protocol data of a plurality of different communication protocols; and
   an IoT protocol translator component, communicatively coupled to a plurality of client devices, configured to translate communications in the plurality of different communication protocols into an IoT protocol based on the translator dataset and process the communications in the IoT protocol with the plurality of client devices;
   wherein the protocol component comprises a manufacturer-specific protocol component configured to receive an updated parameter associated with a manufacturer protocol of the plurality of different communication protocols in the translator dataset, and update the translator dataset with the updated parameter based on the plurality of different communication protocols for different manufacturers;
   wherein the IoT protocol translator component is further configured to transmit the protocol data or the updated parameter in the IoT protocol to the plurality of client devices, the protocol data comprising control data that changes a property or a setting of one or more sensors of the plurality of client devices, and wherein the control data includes a manufacturer parameter derived from a manufacturer protocol related to the plurality of different communication protocols, a unit of measure and a data granularity.

2. The protocol handler system of claim 1, wherein the protocol component or the IoT protocol translator component is further configured to map the protocol data and the updated parameter to the IoT protocol to generate the communications to the plurality of client devices based on the protocol data and the updated parameter.

3. The protocol handler system of claim 1, wherein the IoT protocol translator component is further configured to communicate a first updated parameter of a first communication protocol to a first client device of the plurality of client devices in the IoT protocol, and communicate a second updated parameter related to a second communication protocol that is different from the first communication protocol to a second client device of the plurality of client devices in the IoT protocol.

4. The protocol handler system of claim 1, wherein the protocol component is further configured to receive an updated parameter within a cloud server and process the updated parameter to the translator dataset, and the IoT protocol translator component is further configured map the updated parameter to the IoT protocol based on a look-up table with the translator dataset.

5. The protocol handler system of claim 1, further comprising: a home gateway device with one or more processors comprising the IoT protocol translator component and a communication component coupled to the IoT protocol translator component, configured to receive status data based on one or more sensors from the plurality of client devices and communicate the status data to the protocol component at a cloud server to be stored at the translator dataset and accessible via different manufacturer servers.

6. The protocol handler system of claim 1, wherein the IoT protocol translator component is further configured to receive status data from a first client device of the plurality of client devices and communicate the status data to a second client device of the plurality of client devices, the protocol component, or to both the second client device and the protocol component.

7. The protocol handler system of claim 6, wherein the first client device and the second client device comprise different IoT protocols based on the different manufacturers, and the status data comprises a sensor information related to a property or a setting of a client device of the plurality of client devices that is associated with a manufacturer protocol of the plurality of different communication protocols, a unit of measure and a data granularity that is associated with the sensor information.

8. The protocol handler system of claim 1, wherein the IoT protocol translator component comprises a physical layer of a communication protocol stack, and the protocol component, communicatively coupled to the IoT protocol translator component, comprises a media access control layer and a logical link control sublayer.

9. The protocol handler system of claim 1, wherein the IoT protocol translator component is further configured to receive forwarding data from a client device of the plurality of client devices to communicate to the protocol component, wherein the protocol component is further configured to deliver data or the communications to a target device via a server or bridge client that is a different protocol than a protocol corresponding to the client device based on the forwarding data, wherein the forwarding data comprises at least one of a client device address, a server device address, a client device encapsulation rule, or a server data encapsulation rule.

10. A method for a protocol handler system comprising:
generating, via one or more processors, a translator dataset comprising protocol data with parameters associated with different manufacturer protocols of a plurality of different communication protocols;
translating, via the one or more processors, communications in the plurality of different communication protocols into an IoT protocol based on the translator dataset;
providing, via the one or more processors, the translated communications in the IoT protocol to a plurality of client devices;
in response to receiving sensor status data from a client device of the plurality of client devices in the IoT protocol, translating the sensor status data into a manufacturer protocol of a manufacturer of the different manufacturers based on the translator dataset, and delivering the sensor status data to a server of the manufacturer;
in response to receiving control data related to the different manufacturers that comprises an updated parameter, translating the updated parameter into the IoT protocol based on the translator dataset and delivering the control data to the plurality of client devices, wherein the control data changes a property or a setting of the plurality of client devices and includes a category of the updated parameter, a unit of measure and a data granularity.

11. The method of claim 10, further comprising: receiving a parameter related to at least one of the plurality of different manufacturer protocols from a corresponding manufacturer server device; mapping the parameter to an IoT parameter of the IoT protocol; and generating a communication in the IoT protocol based on the IoT parameter to the plurality of client devices, wherein the plurality of client devices correspond respectively to different protocols corresponding to the plurality of different manufacturer protocols, respectively.

12. The method of claim 11, further comprising generating the communication with the IoT parameter to a client device by translating the IoT parameter to a communication protocol associated with the client device, and updating a sensor data of sensors at the client device with the communication.

13. The method of claim 10, further comprising: wherein the sensor status data indicates a property or a setting with a status data category, a unit of measure and a data granularity, and the manufacturer protocol is different than another manufacturer protocol that is associated with the client device.

14. The method of claim 10, further comprising: in response to receiving forwarding data from the client device or the server, delivering the forwarding data to a target device via the server or a bridge client that is a different protocol than a protocol corresponding to the client device or the server, wherein the forwarding data comprises at least one of a client device address, a server device address, a client device encapsulation rule, or a server data encapsulation rule.

15. The method of claim 10, wherein the translator dataset comprises a set of dictionary and translation rules corresponding to at least one of the plurality of different communication protocols in relation to the IoT protocol.

16. A system to be employed with an internet of things (IoT) network, the system comprising:
a gateway device, communicatively coupled to a plurality of client devices associated with different communication protocols via the IoT network, comprising an IoT protocol translator component configured to enable communications among the plurality of client devices associated with the different communication protocols, and between the plurality of client devices and a plurality of manufacturer servers associated with the different communication protocols; and
a protocol component configured to update a look-up table with associations between the different communication protocols and one or more IoT protocols based on first communications from the plurality of manufacturer servers, and enable a mapping of the first communications associated with the different communication protocols with the one or more IoT protocols based on the associations;
wherein the IoT protocol translator component is further configured to translate the first communications between the different communication protocols and the one or more IoT protocols based on the look-up table, and translate second communications from a client device of the plurality of client devices to a manufacturer server of the plurality of manufacturer servers that is associated with a different communication protocol than the client device;
wherein the first communications comprise protocol data including one or more parameters associated with one or more updates to the look-up table and corresponding to a manufacturer protocol;
wherein the one or more parameters operate to control a property or a setting of at least one of the plurality of client devices and includes at least one of a manufacturer parameter of the manufacturer protocol from at least one of the plurality of manufacturer servers, a unit of measure or a data granularity; wherein the second communications comprise sensory status data from the client device, including at least one of a category of the sensory status data, a sensory data unit, or a sensory data granularity; and wherein the first communications or the second communications further comprise forwarding data comprising at least one of a client device address, a server device address, a client device encapsulation rule, or a server data encapsulation rule.

17. The system of claim 16, wherein the IoT protocol translator component of the gateway device comprises a physical layer of a communication protocol stack configured to communicate the first communications and the second communications, and the protocol component, communicatively coupled to the IoT protocol translator, comprises a media access control layer and a logical link control sublayer within a cloud server.

* * * * *